United States Patent
Seul

[19]

[11] Patent Number: 6,045,001
[45] Date of Patent: *Apr. 4, 2000

[54] BASE GEOMETRY OF REUSABLE PET CONTAINERS

[75] Inventor: Andreas Seul, Mendig, Germany

[73] Assignee: Continental Pet Deutschland GmbH, Mendig, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/945,501

[22] PCT Filed: Apr. 26, 1996

[86] PCT No.: PCT/DE96/00733

§ 371 Date: Oct. 24, 1997

§ 102(e) Date: Oct. 24, 1997

[87] PCT Pub. No.: WO96/33857

PCT Pub. Date: Oct. 31, 1996

[30] Foreign Application Priority Data

Apr. 27, 1995 [EP] European Pat. Off. .............. 95106387

[51] Int. Cl.$^7$ .................................................... B65D 6/00
[52] U.S. Cl. .......................... 220/623; 220/624; 215/371
[58] Field of Search .................... 220/623, 624; 215/371

[56] References Cited

U.S. PATENT DOCUMENTS

| | | | |
|---|---|---|---|
| Re. 34,552 | 2/1994 | Krishnakumar et al. ............ | 438/35.7 |
| 3,692,454 | 9/1972 | Kruger ............................... | 425/355 |
| 3,692,455 | 9/1972 | Kruger ............................... | 425/355 |
| 3,720,339 | 3/1973 | Khetani ............................. | 215/1 |
| 4,134,510 | 1/1979 | Chang ............................... | 215/1 |
| 4,247,012 | 1/1981 | Alberghini ........................ | 215/1 |
| 4,334,627 | 6/1982 | Krishnakumar et al. ........... | 215/1 |
| 4,465,199 | 8/1984 | Aoki ................................. | 215/1 |
| 4,485,134 | 11/1984 | Jacobsen ........................... | 215/371 X |
| 4,755,404 | 7/1988 | Collette ............................ | 428/35 |
| 4,780,257 | 10/1988 | Beck ................................. | 264/40.1 |
| 4,850,494 | 7/1989 | Howard, Jr. ....................... | 215/1 |
| 4,865,206 | 9/1989 | Behm et al. ...................... | 215/375 |
| 4,889,752 | 12/1989 | Beck ................................. | 428/36.92 |
| 4,927,679 | 5/1990 | Beck ................................. | 428/36.92 |
| 4,936,473 | 6/1990 | Nahill et al. ..................... | 215/12.2 |
| 4,954,376 | 9/1990 | Krishnakumar et al. ........... | 428/35.7 |
| 4,981,736 | 1/1991 | Feddersen et al. ................ | 428/36.92 |
| 4,997,692 | 3/1991 | Yoshino ............................ | 215/371 X |
| 5,047,271 | 9/1991 | Feddersen et al. ................ | 215/371 X |
| 5,067,888 | 11/1991 | Torsten ............................. | 425/387.1 |
| 5,080,244 | 1/1992 | Yoshino ............................ | 215/1 |
| 5,122,325 | 6/1992 | Bartley et al. ................... | 264/531 |
| 5,750,224 | 5/1998 | Quasters ........................... | 215/371 X |

FOREIGN PATENT DOCUMENTS 42132 12/1981 European Pat. Off. .
0559103 9/1993 European Pat. Off. .

*Primary Examiner*—Steven Pollard
*Attorney, Agent, or Firm*—Duane Morris & Heckscher LLP

[57] ABSTRACT

A truncated cone is disclosed for molding bottoms of plastic containers, such as PET bottles, into geometries which extend convexly inwardly, are thermostable during hot-washing, and allow substantially full visual inspection with minimum shadow effects. The truncated cone is in the form of a frustoconical bottom insert, which, in a first blow-molding step, creates an intermediate container with a bottom geometry having a substantially wavy cross section. The wavy cross section of the bottom geometry can be accentuated by means of a second mold with a plateau, which creates a slight, upper domed surface in the bottom geometry of the container molded thereby.

9 Claims, 2 Drawing Sheets

BASE GEOMETRY OF REUSABLE PET CONTAINERS

FIELD OF THE INVENTION

The present invention relates to the design of a bottom or base area—in this technical context referred to as "bottom or base geometry"—of plastic bottles, which are made of a preform (an injection-moulded parison) in two blow-moulding steps (application of high internal pressure). These plastic bottles are hot-washable, i.e. their geometry may not change noticeably at a temperature of above 60° C. or 75° C. The mentioned temperature concerns the temperature of the washing fluid at which the bottles must remain thermostable; slight geometric deformations which do not affect mechanical strength or stability are permissible.

BACKGROUND OF THE INVENTION

In most cases plastic bottles are made of PET, which forms a single or multi-layer bottle wall. In the bottom area, the bottles must have a safe stand and have ability to withstand internal pressure. In this context, "stability" denotes stability during normal use. Another type of stability mentioned above is thermostability when hot-washing the bottle and thus the pre-condition for a reusability of the bottle. The bottom area must have an additional feature, i.e. it must be "inspectable", a term which experts in this technical field use to characterize an unobstructed view through the bottom area in direction of the bottle axis. Inspection of the bottom must not be affected by shadows and other optical refraction, because this would make visual inspection of the empty bottle by a camera or the eye impossible.

SUMMARY OF THE INVENTION

It is therefore an object of the present invention to provide a bottom geometry for plastic bottles which is thermostable (thermally stable) and avoids shadow effects, i.e. allows full inspection, so that residual washing liquid (from cleaning) or foreign matter (impurities) located in the container can be reliably (fully) spotted before the bottle is filled. It is an object of the present invention to allow full inspection of the bottle without making concessions regarding the bottom diameter, as is the case in the art, where the bottle is given for example a substantially hemispherical outwardly oriented bottom geometry which is circumferentially reduced in diameter as the bottle is pressed in a plastic support ring to provide a secure support surface.

This solution impairs the ability of inspection because the plastic support, which is the reason for the reduction in diameter of the bottle base, is opaque. Functionally, its geometry is such that—even if it were transparent—a full, shadow-free inspection of the empty bottle through the bottom would be impossible.

The present invention offers a triform solution to the above problem, namely the use of a truncated cone of frustoconical bottom insert (Claim 1) or a manufacturing process in which in a first blow-moulding step, a preform is given a frustoconical bottle bottom, which bottom develops a wavy cross-section after removal from the mould (Claim 9), or an apparatus for carrying out said process, in which a first blow mould is provided with a frustoconical bottom and a second blow mould has a substantially dome-shaped bottom (Claim 11).

The shape of the substantially dome-shaped mould bottom according to Claim 11 is adapted to the geometry of the bottom of the bottle, as removed from the first blow mould (Claim 16), so that the bottom geometry is insubstantially changed in the second blow-moulding step, the only modification being that the basic shape of the bottom becomes more distinct. Identical geometry, however, does not mean identical dimensions (measurements), but only identical shape (relative position of the part shapes and the part shapes themselves).

The bottom develops its basic architecture after being removed from the frustoconical bottom insert, which has a substantially plane or even (flat) lateral surface, or after shrinking, which causes detachment from said insert. Surprisingly, it turned out that the wave structure developing in the bottom architecture after removal or shrinkage already is a thermostable bottom geometry which allows full optical inspection without shadow effects. This base or bottom geometry has a wavy cross-section, i.e. it presents a first curved portion having a radius r' and substantially the shape of a spherical segment and being convexed in inward direction of the bottle, and a second, curved portion having a radius r" and being convexed in outward direction, said first curved portion r' blending into said second curved portion r".

A base stand ring, on which the bottle stands securely, is located radially outside said first curved portion.

The surprising effect of the invention is attributed to a "memory effect" in the linear portion of the bottom, which effect causes the bottom to self-develop waves once the supporting flat cone frustum is removed, the bottom thus becoming substantially free of internal stress. The shape of the bottom is different from the shape of the truncated cone forming it; thus, the shape of the bottom and the shape of the bottom-forming mould are markedly different, the first being wave-shaped, the second having a substantially plane flat lateral surface ("Mantelfläche").

In a second blow-moulding step, the already wavy geometry of the bottom can be accentuated if the bottom is again blow-moulded on a second blow mould insert. This mould insert has substantially the same shape as the bottom has obtained after the first blow-moulding step and after removal from the frustoconical insert, so that the shape undergoes only slight modifications (Claim 16). One such modification may be to provide a domed top which corresponds to the upper plateau portion of the truncated cone or cone frustum (Claim 8)—reproduced in the bottle bottom (Claims 17, 7).

Between the two curved portions of the bottom resulting from the first blow-moulding step is a point of inflexion, which is noticeably offset in inward direction, an indication that the first (outer) curved portion is more accentuated than the second (inner) curved portion of the bottom geometry. The second mould insert has a corresponding shape, whereas the first insert for the first blow-moulding step has a substantially linear (or: flat, even) lateral surface.

The angle at which the cone frustum's lateral (outer) surface is inclined can be between 40° and 70°, preferably it is 60° (Claims 4, 5).

The frustoconical bottom of the first blow mould can be either an insettable part or "insert" (Claim 1) or can be adapted to be integral with the blow mould whose bottom it forms (Claim 1, Claim 11).

The two-step blow-moulding process, which is expressly mentioned, relates to the preform, which is formed under pressure into an intermediate container in a first blow-moulding step. The intermediate container can be significantly larger than the final container. The intermediate container is shrunk to a size which is smaller than that of the final container. In a second mould, the shrunk intermediate container receives its final shape. However, the wavy bottom design remains mathematically similar, which means that, even if the dimensions change through shrinkage, the geometry (identity of shape) remains the same.

Both blow-moulding steps can be organized in such a way that the bottles or intermediate containers are placed removably on a carrier wheels for each blow-moulding step respectively (Claims 13, 14), so that they can be easily moulded and continuously cooled.

In addition to the surprising effect that the bottom geometry resulting from the use of a frustoconical first mould bottom can be fully inspected, there is also potential for plastic material savings. First calculations have shown that up to 10% of material can be saved if the container is adapted to have a linear bottom portion corresponding to the cone frustum of the blowing mould bottom and if—after removal from the mould—the bottle bottom deforms individually and without external influence to adopt a different bottom geometry which has substantially the same shape as the final bottle is intended to have after shaping on the second bottom insert.

No major modifications to the bottom geometry are required to guarantee thermostability, stand stability and full inspectability without shadow effects, so that there is no need for additional curves and waves. Artificial stress compensation is therefore not required.

Material savings are particularly high if according to the invention, the thick bottoms of the prior plastic containers are thinned without affecting thermostability in the bottom section.

BRIEF DESCRIPTION OF THE INVENTION

Embodiments are given to explain and illustrate the invention.

FIG. 1 is an example of a frustoconical bottom 1 with a linear surface 1a, an annular groove 1b continuously flattening out at the lower end and an upper flat plateau 1c.

FIG. 1a is the counterpart of FIG. 1. It is a fragmentary part of a PET bottle extending in upward direction along the axis 100, namely of the bottom section 10 which is convexed in inward direction and has an annular stand surface or line 10r at the lower end. The outer wall of the bottle, which is not shown, extends in upward direction from this stand surface.

FIG. 2 shows the second bottom insert or the second bottom mould 20, the surface contour of which is dome- or bell-shaped and is closely adapted to the bottom architecture 10 depicted in FIG. 1a.

FIG. 2a shows the bottom geometry of the bottle after blow-moulding on the mould bottom 20 depicted in FIG. 2, wherein the waves 10',10" of the wave geometry 10',10", 10w already visible in FIG. 1a have become more accentuated, but the point of inflexion 10w remains unchanged.

DETAILED DESCRIPTION OF THE DRAWINGS

Figure 1:
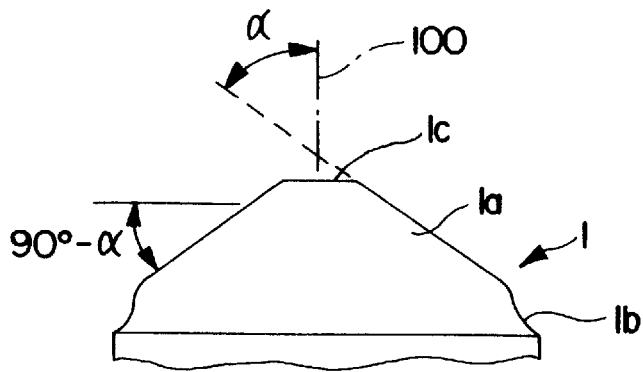
Figure 1A:
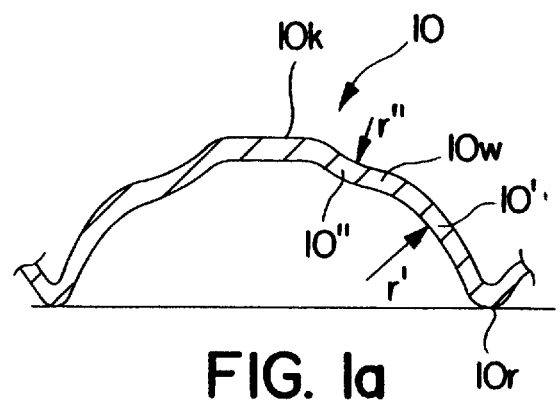

In FIG. 1 a lateral surface 1a extending substantially straight-lined or even is drawn at an angle alpha ($\alpha$) with respect to the vertical direction (the bottle axis 100). At the inner end of the straight lateral surface, the mould bottom insert 1 presents an even plateau 1c extending in horizontal direction. At the lower, outer end of the straight lateral surface 1a, an annular groove section 1b is shown, which serves to form the stand circle or the annular base surface 10r. In a first blow-moulding step, the bottom section of the preform is pressed (on) to the frustoconical bottom 1 of FIG. 1. A substantially straight bottom section being inclined at an angle alpha is obtained which bottom section spontaneously and without external influence adopts a bottom geometry as shown in FIG. 1a after the bottle has shrunk or was removed from the bottom of FIG. 1. This bottom geometry develops surprisingly due to the release of internal stress after the first blow-moulding step, the so-called "memory effect" of the preforms after stretch blowing, which internal stress is built up through the linear, inclined surface in precisely such a way that the wavy shape develops.

The geometry has a wavy cross-section, showing a first, outer arcuate or curved portion 10' having a radius r' which extends from the bearing (stand) bead 10r or stand circle 10r towards the inside. At a point of inflexion 10w, it blends into a portion 10" curved in opposite direction and having a smaller radius r", which leads into a disk-like plateau 10k. The plateau can be plane or slightly domed. A smooth transition from the upper curved portion r2 to the plateau is achieved due to a third curved portion r3.

With this geometry, an inwardly convexed bottom is substantially achieved, although one would expect the bottom insert 1 to produce a bottom geometry completely different from the actual geometry which the bottom develops after the internal stress is released to a substantial extent.

Figure 2:
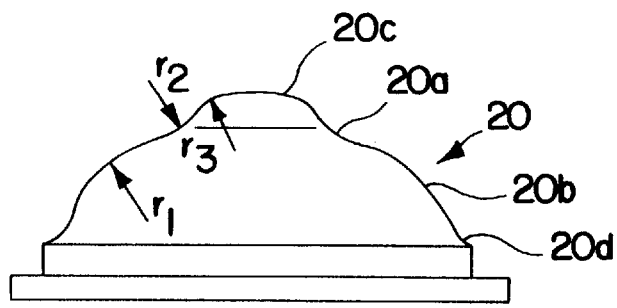

FIG. 2 shows a second bottom insert 20, the design of which is closely matched to the shape which the bottom of the bottle shown in FIG. 1a develops. As in FIG. 1a, two oppositely curved radii r1 and r2 are present, which define a first curved portion 20b and a second portion 20a curved in opposite direction, the latter being located radially more inward than the first-mentioned. The inner curved portion 20a leads into a slightly curved, offset dome 20c, which is adapted to the plateau 10k of FIG. 1a in its radial extension. The outer curved portion 20b has the shape of a spherical zone or segment and merges into the mould segment defining the inner portion of the stand bead 10r.

Figure 2A:
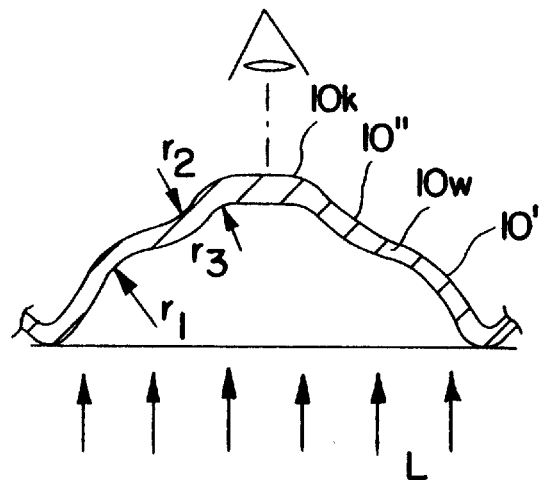

The result of the second stretch-blowing step (blow-moulding step) is shown in FIG. 2a, where the basic bottom geometry already visible in FIG. 1a is more accentuated, but not substantially modified.

The geometries of FIGS. 1a,2a are substantially "similar" (in a mathematical sense).

The last mentioned bottom geometry has unrestricted inspection ability, which is indicated by the vertical arrows L drawn parallel to the central axis 100. No section of the domed bottom extending (in cross-section) by radial waves shows shadows S. The absence of shadows makes it possible to reliably detect—after hot washing—residual washing liquid or contamination in the interior of the bottle.

Figure 3:
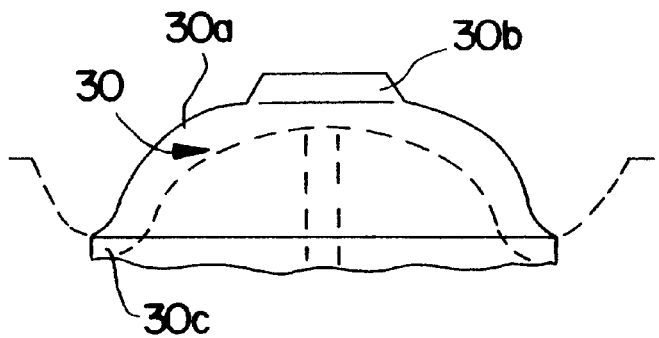
FIG. 3 shows the state of the art, according to which the mould bottom insert 30 is substantially domed to give the bottle a distinct dome shape already in the first blow-moulding step.
Figure 3A:
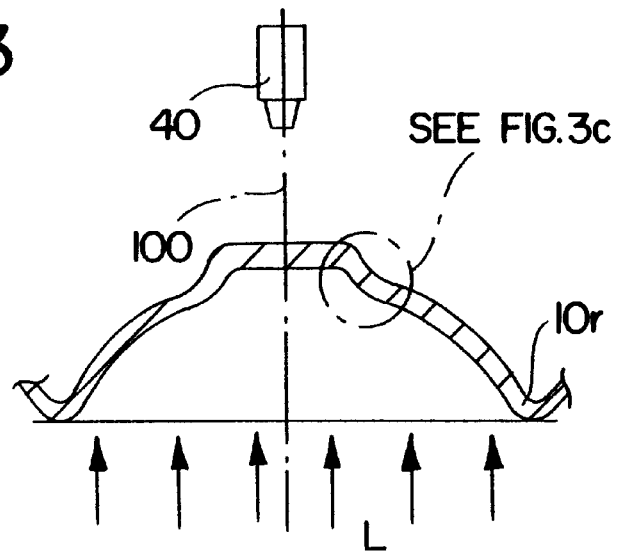
FIG. 3a depicts the bottom geometry which is obtained when the container removed from the bottom insert of FIG. 3 has shrunk and been subjected to another (second) blow-moulding step, a section E being shown in detail in FIGS. 3b and 3c.
Figure 3B:
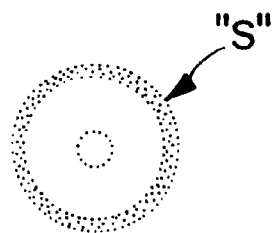
FIG. 3b, FIG. 3c represent a view L in direction of the axis 100 of FIG. 3a and a detail of the cross-section of FIG. 3a denominated E. Here, the shadows are visible which occur in a bottom geometry, the first blow-moulding step of which is characterizingly influenced by the bottom insert used in FIG. 3.
Figure 3C:
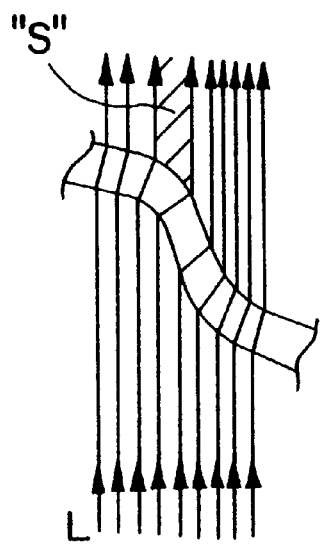

Shadow formation S in a prior art bottle is shown in FIGS. 3b, 3c, and the area causing this shadow zone S—represented as an annular darkened area in FIG. 3b—is shown in FIG. 3a. A camera 40 with a lens designed to project an image of the complete bottom section within the stand ring 10r would comprise the ring of FIG. 3b. This zone is responsible for the fact that only restricted optical examination—restricted optical inspection ability—is possible, so that with this bottom section, it is impossible to achieve the results that are obtained with the bottom section of FIG. 2b only using a frustoconical bottom 1 as represented in FIG. 1.

For illustration purpose, the counterpart of FIG. 1 is shown in FIG. 3, which counterpart is used in the art to mould the bottom section in a first blow-moulding step resulting in the bottom geometry of FIG. 3a in the second blow-moulding step. A dominating spherical segment 30a is shown which extends almost throughout the complete bottom section and imparts an architecture to the bottom which is only curved in inward direction within the stand bead 30c or 10r. A second bottom insert—not shown—is required modify this domed structure to obtain a geometry which offers thermostability and mechanical strength, but does not allow unrestricted, optimum inspection.

The angle alpha shown in FIG. 1, which defines the inclination of the lateral surface 1a of the cone frustum with respect to the vertical line, is about 60°; the surprising wave structure self-shaping, when the bottom is removed from the cone frustum, still appears if the angle is slightly larger or smaller. Outside the mentioned sections, no self-developed change in shape—caused by the "memory effect"—occurs.

The technical field of the present invention relates to bottom geometries of PET bottles which are convexed in inward direction to make them thermostable during hot-washing and allow full visual inspection. To achieve these aims, the invention proposes the use of a frustoconical bottom insert (1;1a;1b,1c), on which in a first blow-moulding step of the preform, a bottom geometry of the container as an intermediate product form is shaped, having substantially wavy cross-section (10,10",10w). A surprising side-effect of this bottom geometry is the material saving of up to 10% compared to thicker, hot-washable bottom designs.

The self developing wavy bottom geometry can be accentuated by a second mould bottom (20), and the plateau (10k) can be given a slight upper doming.

I claim:

1. A plastic container comprising:

a bottom of the container with a generally inwardly curved shape to define a generally hemispherical dome shape wherein a preliminary bottom is formed by engagement of a bottom portion of a preform with a truncated cone in a first blow-molding operation, said preliminary bottom being separated from the truncated cone for developing into the generally hemispherical dome shape of the container bottom;

the truncated cone having a substantially planar lateral surface and a disk shaped top; the generally hemispherical dome shape consisting essentially of a disk shaped dome center portion, proceeding radially outwardly through annulus shapes successively defining in cross section:

a first outward curved segment, inclined with respect to an axis of the container, an inward curved segment, and a second outward curved segment leading to a side wall of the container; and, wherein the dome center and each of the segments join smoothly to at least one adjacent segment whereby the container is viewable through the bottom substantially without obstruction by shadow formation.

2. The container of claim 1, wherein the inward curved segment comprises a spherical segment having a first radius and the outward curved segment having a second radius, the first and second radii being accentuated by a second blow-molding operation using a mold with curvatures which are oriented in opposite directions from each other.

3. The container according to claim 2, wherein the first radius is significantly larger than the second radius.

4. The container according to claim 1, wherein the lateral surface of the preliminary bottom is planar and inclined at an angle of between 40° and 70° with respect to a longitudinal axis of the container.

5. The container according to claim 4, wherein the lateral surface is inclined at an angle of 60°.

6. The container according to claim 1, wherein the truncated cone has a substantially flat plateau, wherein the bottom of the container has said central portion corresponding to the plateau, and wherein the central portion is slightly domed by means of applying the mold bottom in the second blow-molding operation.

7. The container according to claim 1, wherein the dome center portion has a plateau with a shape selected from the group consisting of a substantially flat surface or a slight domed surface; and further comprising a circumferential groove at a lower end of the lateral surface, said groove being directed inwardly.

8. A plastic container comprising:

a side wall and a bottom with a generally inwardly curved shape to define a generally hemispherical dome shape the generally hemispherical dome shape consisting essentially of a dome center portion covering a first portion of the generally hemispherical dome shape and proceeding radially outwardly through annulus shapes and successively defining in cross section:

a first outward curved segment covering a substantial portion of the remainder of the generally hemispherical dome shape, an inward curved segment, and a second outward curved segment leading to the side wall; and wherein the dome center portion and each of the segments join smoothly to at least one adjacent segment.

9. A container made from a thermoplastic preform in a blow molding process, the container comprising:

a side wall and a bottom portion with a generally inwardly curved shape to define a generally hemispherical dome shape, the generally hemispherical dome shape consisting essentially of a dome center portion proceeding radially outwardly and axially downwardly through annulus shapes and successively defining in cross section:

a first outward curved segment having a ring shape, an inward curved segment, and a second outward curved segment leading to the side wall;

wherein the dome center portion and each of the segments join smoothly to at least one adjacent segment.

* * * * *